(12) United States Patent
Saito et al.

(10) Patent No.: US 7,370,112 B2
(45) Date of Patent: May 6, 2008

(54) COMMUNICATION SCHEME USING OUTSIDE DTCP BRIDGE FOR REALIZING COPYRIGHT PROTECTION

(75) Inventors: Takeshi Saito, Tokyo (JP); Hiroshi Isozaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 888 days.

(21) Appl. No.: 10/722,515

(22) Filed: Nov. 28, 2003

(65) Prior Publication Data

US 2004/0158634 A1 Aug. 12, 2004

(30) Foreign Application Priority Data

Nov. 27, 2002 (JP) .......................... P2002-344431

(51) Int. Cl.
*G06F 15/16* (2006.01)

(52) U.S. Cl. ................. 709/229; 709/201; 709/202; 709/217; 709/220; 709/225; 709/226; 709/227

(58) Field of Classification Search ................. 709/201
See application file for complete search history.

(56) References Cited

U.S. PATENT DOCUMENTS

| | | | |
|---|---|---|---|
| 6,526,581 B1* | 2/2003 | Edson | 725/74 |
| 7,219,227 B2* | 5/2007 | Hori et al. | 713/158 |
| 2001/0034759 A1* | 10/2001 | Chiles et al. | 709/203 |
| 2002/0083342 A1* | 6/2002 | Webb et al. | 713/201 |
| 2002/0152381 A1* | 10/2002 | Kuriya et al. | 713/170 |
| 2003/0115485 A1* | 6/2003 | Milliken | 713/201 |
| 2004/0158634 A1 | 8/2004 | Saito et al. | |

FOREIGN PATENT DOCUMENTS

| | | |
|---|---|---|
| JP | 2000-174797 | 6/2000 |
| JP | 2001-285283 | 10/2001 |
| JP | 2002-140304 | 5/2002 |
| JP | 2002-252882 | 9/2002 |

OTHER PUBLICATIONS

U.S. Appl. No. 10/599,958, filed Oct. 16, 2006, Saito et al.

(Continued)

*Primary Examiner*—Jason Cardone
*Assistant Examiner*—Nicholas R Taylor
(74) *Attorney, Agent, or Firm*—Oblon, Spivak, McClelland, Maier & Neustadt, P.C.

(57) ABSTRACT

An outside DTCP bridge for relaying information between an outside communication device connected to an outside network and a home communication device connected to a home network, carries out a first authentication and key exchange processing for purpose of copyright protection between the outside DTCP bridge and the home communication device as well as a second authentication and key exchange processing for purpose of copyright protection between the outside DTCP bridge and the outside communication device, and stores an identification information of the outside communication device. Then, transmission/reception of information between the home network and the outside network is carried out only when the outside communication device which made the access request is stored and both the first authentication and key exchange processing and the second authentication and key exchange processing succeed.

17 Claims, 8 Drawing Sheets

OTHER PUBLICATIONS

U.S. Appl. No. 10/722,515, filed Nov. 28, 2003, Saito et al.
U.S. Appl. No. 11/130,135, filed May 17, 2005, Isozaki et al.
U.S. Appl. No. 11/034,845, filed Jan. 14, 2005, Isozaki et al.
U.S. Appl. No. 11/019,349, filed Dec. 23, 2004, Matsushita et al.
U.S. Appl. No. 10/984,989, filed Nov. 10, 2004, Isozaki et al.
U.S. Appl. No. 10/876,705, filed Jun. 28, 2004, Saito et al.
U.S. Appl. No. 10/782,896, filed Feb. 23, 2004, Saito et al.
U.S. Appl. No. 10/352,128, filed Jan. 28, 2003, Saito et al.
U.S. Appl. No. 10/615,768, filed Jul. 10, 2003, Nakakita et al.
U.S. Appl. No. 10/722,468, filed Nov. 28, 2003, Saito et al.
U.S. Appl. No. 10/729,964, filed Dec. 9, 2003, Isozaki et al.
U.S. Appl. No. 11/071,252, filed Mar. 4, 2005, Isozaki et al.

* cited by examiner

| REQUIRED ITEMS | OPTIONAL ITEMS | | |
|---|---|---|---|
| RECEPTION DEVICE #1<br>DEVICE ID AA<br>UNIQUE ID XX | ACCESS START TIME<br>DATE/HOUR/MINUTE | REGISTRATION TIME<br>DATE/HOUR/MINUTE | ACCESS STATE<br>ACCESSING |
| RECEPTION DEVICE #2<br>DEVICE ID AA<br>UNIQUE ID YY | DATE/HOUR/MINUTE | DATE/HOUR/MINUTE | --- |
| RECEPTION DEVICE #3<br>DEVICE ID BB<br>UNIQUE ID ZZ | DATE/HOUR/MINUTE | DATE/HOUR/MINUTE | ACCESSING |
| ... | ... | | |

COMMUNICATION SCHEME USING OUTSIDE DTCP BRIDGE FOR REALIZING COPYRIGHT PROTECTION

BACKGROUND OF THE INVENTION

1. Field of the Invention

The present invention relates to a communication relay device, a communication system, and a communication control program for relaying transmission and reception of information between an inside network and an outside network.

2. Description of the Related Art

The products called digital information home electronics are becoming popular. These products are expected to become even more popular in conjunction with the start of the digital broadcasting, and include all kinds of products for handling digital data and digital contents such as digital broadcasting compatible TV, set-top box, digital VTR, DVD player, hard disk recorder, etc.

The quality of the digital data and digital contents will not be degraded even when they are copied, and the copies can be made easily, so that there is a need to provide a measure for the copyright protection in advance. For example, in the IEEE 1394 which is a digital network for connecting digital AV devices, the authentication and key exchange mechanism and the data encryption function are provided.

Here, consider a case of transferring the AV data that requires the copyright protection, from some transmission device. What needs to be taken into consideration here is that the copyright protection presupposes to allow the exchange of the AV data within a range of personal (or family) entertainment, but to prevent the exchange of the AV data with a third person (unless the permission from the copyright holder is given).

A known mechanism for realizing the copyright protection on a network includes DTCP (Digital Transmission Content Protection), which is a copyright protection scheme that has become de facto standard in IEEE 1394 and USB.

The DTCP is provided with a mechanism for carrying out the authentication and key exchange between a transmission device and a reception device and transferring the AV data by encrypting them, with respect to contents such as the AD data that require the copyright protection (see documents disclosed at "http://www.dtla.com", for example). By using this DTCP, it becomes possible to transmit the AV data in a state that guarantees the copyright protection, on an inside network (IEEE 1394 network, for example).

On the other hand, in conjunction with the spread of the internet, it has become customary to exchange the digital data on a public network. Under such a circumstance, there can be cases where a user requests an access to the data maintained at the user's home in a mobile environment, as in a case of access from the user's villa. If such a request is to be rejected for the reason of the copyright protection, the user's convenience would be severely damaged.

However, the current DTCP has its application target limited to home networks such as IEEE 1394. In order to make it possible for a user to make an access to the contents maintained at the user's home in the mobile environment, there is a need to expand the current DTCP such as it can be used outside as well, and to expand the mechanism realized by the inside DTCP to the outside, but there has been no proposition for such a new mechanism conventionally.

BRIEF SUMMARY OF THE INVENTION

It is therefore an object of the present invention to provide a communication relay device, a communication system and a communication control program in which information that has been transmitted/received between inside networks can be transmitted/received even between outside networks while maintaining the copyright protection.

According to one aspect of the present invention there is provided a communication relay device connected to a home network, for relaying information between an outside communication device connected to an outside network and a home communication device connected to the home network, comprising: a first copyright protection unit configured to carry out a first authentication and key exchange processing for purpose of copyright protection between the communication relay device and the home communication device on the home network; a second copyright protection unit configured to carry our a second authentication and key exchange processing for purpose of copyright protection between the communication relay device and the outside communication device on the outside network, based on a scheme different from the first authentication and key exchange processing; an identification information memory unit which stores an identification information of the outside communication device and a bridge processing unit configured to receive an access request for the home network from the outside communication device, and carry out transmission/reception of information between the home network and the outside network only when the outside communication device which made the access request is stored in the identification information memory unit and then only when both the first authentication and key exchange processing by the first copyright protection unit and the second authentication and key exchange processing by the second copyright protection unit succeed.

According to another aspect of the present invention there is provided a communication system, comprising: a home communication device on a home network; an outside communication device on an outside network; and a communication relay device for relaying information between the home network and the outside network, the communication relay device having: a first copyright protection unit configured to carry out a first authentication and key exchange processing for purpose of copyright protection between the communication relay device and the home communication device on the home network; a second copyright protection unit configured to carry out a second authentication and key exchange processing for purpose of copyright protection between the communication relay device and the outside communication device on the outside network, based on a scheme different from the first authentication and key exchange processing; an identification information memory unit which stores an identification information of the outside communication device; and a bridge processing unit configured to receive an access request for the home network from the outside communication device, and carry out transmission/reception of information between the home network and the outside network only when the outside communication device which made the access request is stored in the identification information memory unit and then only when both the first authentication and key exchange processing by the first copyright protection unit and the second authentication and key exchange processing by the second copyright protection unit succeed.

According to another aspect of the present invention there is provided a computer program product for causing a computer to function as a communication relay device connected to a home network, for relaying information between an outside communication device connected to an outside network and a home communication device connected to the home network, the computer program product comprising: a first computer program code for causing the computer to carry out a first authentication and key exchange processing for purpose of copyright protection between the communication relay device and the home communication device on the home network; a second computer program code for causing the computer to carry out a second authentication and key exchange processing for purpose of copyright protection between the communication relay device and the outside communication device on the outside network, based on a scheme different from the first authentication and key exchange processing; a third computer program code for causing the computer to store an identification information of the outside communication device; and a fourth computer program code for causing the computer to receive an access request for the home network from the outside communication device, and carry out transmission/reception of information between the home network and the outside network only when the outside communication device which made the access request is stored in the identification information memory unit and then only when both the first authentication and key exchange processing by the first computer program code and the second authentication and key exchange processing by the second computer program code succeed.

Other features and advantages of the present invention will become apparent from the following description taken in conjunction with the accompanying drawings.

DETAILED DESCRIPTION OF THE INVENTION

Referring now to FIG. 1 to FIG. 7, the first embodiment of the communication scheme according to the present invention will be described In detail.

Figure 1:
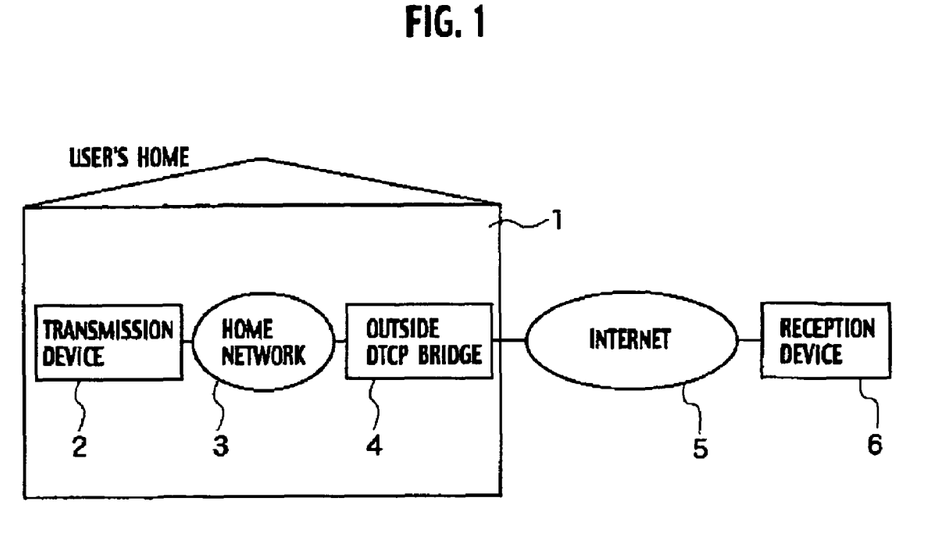
FIG. 1 is a block diagram showing art overall configuration of a communication system according to the first embodiment of the present invention.

FIG. 1 shows an overall configuration of a communication system according to the first embodiment of the present invention. The communication system of FIG. 1 has a transmission device 2, a home network 3 and an outside DTCP bridge 4 which are provided inside a user's home 1, and a reception device 6 at outside which is connected to the user's home 1 through the Internet 5.

Here, a specific form of the home network 3 is not essential, and any of 802.11 radio LAN, Ethernet, and IEEE 1394 can be used, for example. The home network 3 may have other devices connected thereto besides those shown in FIG. 1. Also, in the case of using the Internet protocol on the home network 3, a specific type of the protocol is not essential, and any of IPv4 and IPv6 can be used, for example.

The outside DTCP bridge 4 is a feature of this embodiment, which mediates transmission/reception of the AV data that require the copyright protection, between the transmission device 2 inside the user's home 1 and the reception device 6 at outside. The outside DTCP bridge 4 is connected with the home network 3 and the Internet 5.

Figure 2:
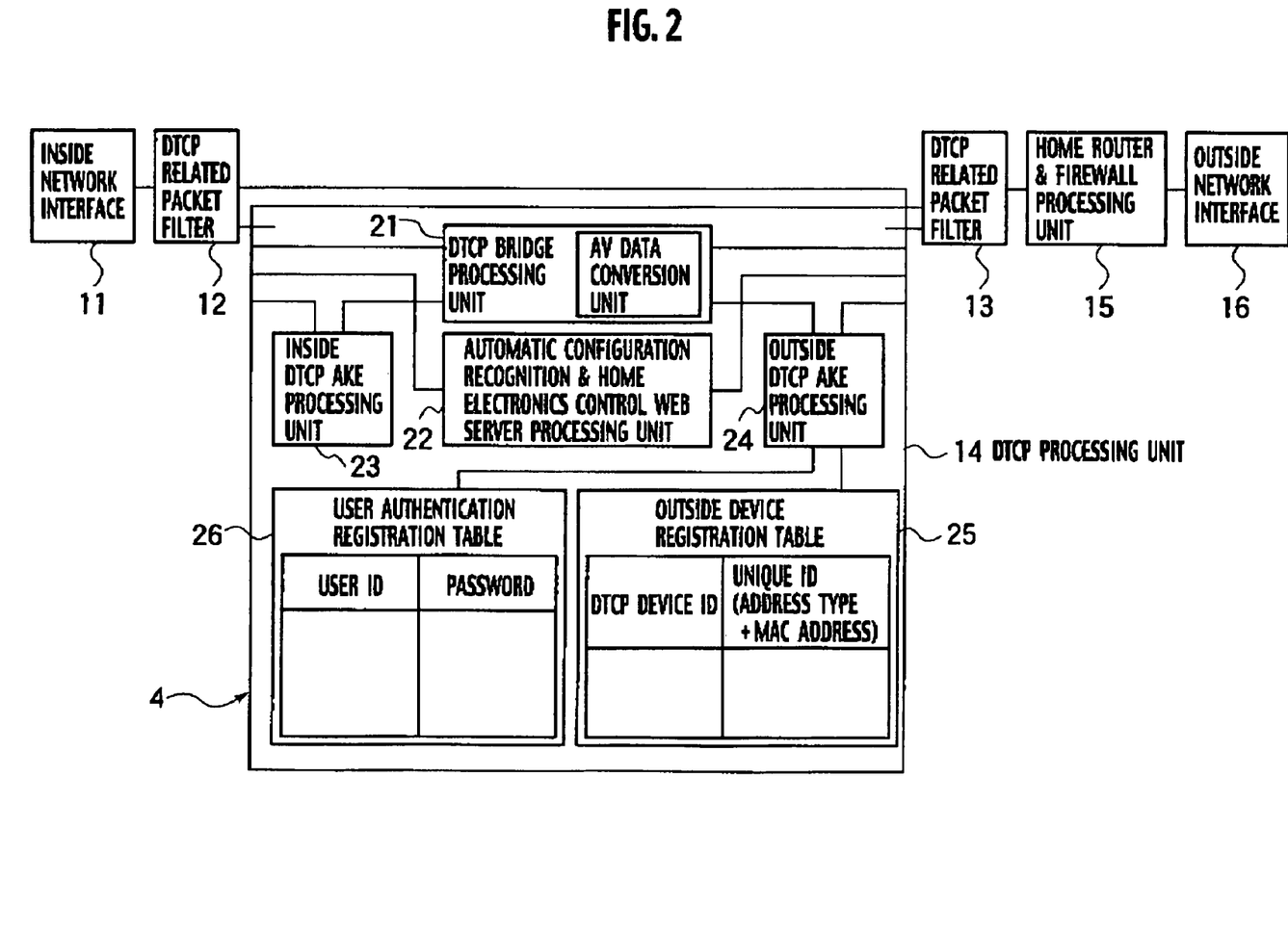
FIG. 2 is a block diagram showing an internal configuration of an outside DTCP bridge in the communication system of FIG. 1.

FIG. 2 shows an internal configuration of the outside DTCP bridge 4. The outside DTCP bridge 4 has an inside network interface 11, DTCP related packet filters 12 and 13, a DTCP processing unit 14, a home router and firewall processing unit 15, and an outside network interface 16. Besides these, the outside DTCP bridge 4 may have a built-in modem (ADSL modem or photo-electric conversion device for FTTH).

The inside network interface 11 is a module that functions as an interface with the home network 3 such as radio LAN, Ethernet, IEEE 1394, etc. The DTCP related packet filter 12 located between the inside network interface 11 and the DTCP processing unit 14 has a function for selectively distributing the control packets of the DTCP which is the copyright protection processing (packets for the authentication and key exchange of the DTCP, for example) and packets containing the AV data that require the copyright protection among the packets entered from the inside network interface 11, to the DTCP processing unit 14. Also, the DTCP related packet filter 112 multiplexes the packets from the DTCP processing unit 14 and the packets unrelated to the DTCP that are outputted from the other DTCP related packet filter 13, and output them to the inside network interface 11.

The outside network interface 16 is a module that functions as an interface with the Internet 5 (public network). The home router and firewall processing unit 15 is a module that has functions of home router. NAT (Network Address Translation), firewall, etc. The DTCP related packet filter located between the home router and firewall processing unit 15 and the DTCP processing unit 14 carries out the operation similar to the DTCP related packet filter 12.

The DTCP processing unit 14 has an automatic configuration recognition and home electronics control Web server processing unit 22, an inside DTCP AKE processing unit 23, an outside DTCP AKE processing unit 24, an outside device registration table 25, and a user authentication registration table 26.

The DTCP processing unit 14 carries out the processing related to time DTCP copyright protection, and this processing mainly includes: (1) the DTCP authentication and key exchange processing between the transmission device 2 and the reception device 6 (or the other DTCP bridge) through the inside network interface 11 and the outside network interface 16, (2) the encryption/decryption processing for the AV data that require the copyright protection, (3) the DTCP bridge processing, and (4) the AV data coding conversion processing, the protocol conversion processing, the bandwidth conversion processing, etc., which are carried out according to the need.

The inside DTCP AKE processing unit 23 carries out the DTCP authentication and key exchange (AKE) processing on inside home side. The DTCP authentication and key exchange is carried out by using packets indicated by specific port numbers (port numbers allocated to the DTCP AKE) on the IP packets, frames dedicated for the DTCP on the radio LAN or Ethernet, or security commands for AV/C packets of the IEEE 1394, for example. The authentication and key exchange that is carried out inside the home has a range of its validity limited to inside the home, so that it may be provided with measures such as setting a value of the TTL (Time To Live) equal to 1, 2 or 3, using a link local address as the IP address, using Ethernet frames instead of IP packets in the packet transmission, or limiting the time-out period until the packets reach, for example.

The outside DTCP AKE processing unit 24 carries out the DTCP authentication and key exchange (AKE) processing on outside home side. The outside DTCP authentication and key exchange is carried out by using packets indicated by specific port numbers on the IP packets or by HTTP with an indication of the DTCP packet using specific label (X-DTCP, for example) of the HTML. When the HTTP is used, there is an advantage in that the communications can be continued even when the proxy server or the network address translation (NAT) device exists in a middle of a route used for the authentication and key exchange. In the outside DTCP authentication and key exchange, there is no need to set a limit to the value of the TTL, for example, and the communications may be established by using a global IP address, because how far away the location of the correspondent device (the reception device 6 in this embodiment) is from the DTCP bridge is unknown.

In the DTCP, a mechanism called sink limitation is defined. Namely, it is a mechanism for limiting a number of devices that can carry out communications simultaneously (or a number of devices that can exchange the identical AV stream simultaneously) to be less than or equal to a certain number. If the sink limitation mechanism is not introduced, a practically unlimited number of devices can be connected on an identical network, and a huge number of copies of the AV data can be made for the connected devices from a single AV stream such that a large amount of the copied contents are generated. The sink limitation is introduced in order to prevent such a problem.

The outside DTCP bridge 4 of this embodiment has four features (1) to (4) described below, by reinforcing the sink limitation mechanism. Note that it is also possible to realize only a part of these features (1) to (4).

(1) A device from which access can be made from outside the home (the reception device 6, for example) is registered in advance into the outside device registration table 25, and the communication (a request for the authentication and key exchange) from any device other than those registered in this registration table will be rejected.

(2) The number of devices that can be registered into the outside device registration table 25 is limited to be less than or equal to a certain number (16 devices, for example) (in other words, there is an upper limit for a size of the table).

(3) The device that is registered once will remain registered in the outside device registration table 25 permanently (the registration is not lost even when the power is turned off or the power supply is reduced).

(4) The registration into the outside device registration table 25 can be made only inside the home.

Figure 3:
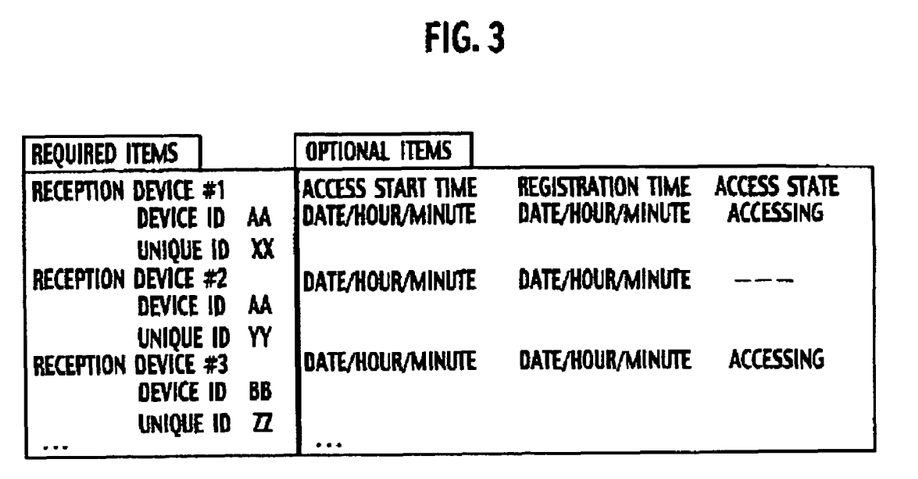
FIG. 3 is a diagram showing an exemplary data structure of an outside device registration table in the outside DTCP bridge of FIG. 2.

FIG. 3 shows an exemplary data configuration of the outside device registration table 25. As shown in FIG. 3, the outside device registration table 25 is divided into required items and the optional items, where the required items include at least one of a device ID that is described in a device certificate for the copyright protection that has to be allocated to each device (the reception device 6 in this embodiment), and a MAC address which is an ID unique to that device (which is expressed by a combination of address type and ID in general, as in the case of IEEE 802 address, for example). The optional items include an access start time, a registration time indicating a time at which the registration into the outside device registration table 25 was made, and an access state. Note that the required items are indispensable, but the optional items can be set up according to the need.

Only the DTCP devices that are registered into the outside device registration table 25 in advance can participate in the DTCP bridge communications with the user's home 1 through the outside DTCP bridge 4. In other words, any device other than those registered in advance cannot carry out the DTCP bridge communications.

Also, the number of the devices that can carry out communications is limited to a certain number because of the feature (2) described above, it becomes impossible to rewrite the content of the outside device registration table 25 at each occasion of the communication so as to obtain a permission for the communication to different device in each occasion such that data can be transmitted to practically unlimited number of devices (at different transmission timings). Consequently, it is possible to prevent the illegal copy by the user, and it is also possible to prevent accesses by the unspecified many devices to the outside DTCP bridge 4. In other words, according to this embodiment, the number of reception devices that can make access from the outside can be surely limited to the number described in the feature (2).

The outside device registration table 25 should preferably be configured such that that the alteration by the user is impossible. This is because if the alteration by the user is possible, it would become possible to carry out communications with a practically unlimited number of devices by registering the device to carry out the communication with at each occasion of the communication.

The user authentication registration table 26 registers a user ID and a password of the reception device 6 that can make access to the outside DTCP bridge 4. The outside DTCP AKE processing unit 24 carries out the user authentication for checking whether the user ID and the password of the reception device 6 that made a DTCP authentication and key exchange request are registered in the user authentication registration table 26 or not when the DTCP authentication and key exchange request is made from the outside the home side, and carries out the DTCP authentication and key exchange processing only when the user authentication succeeds.

In this way, it becomes possible to reject the access requests from the DTCP devices of the others whose user IDs and passwords are not registered even if they are in compliance with the DTCP.

Both the outside device registration table 25 and the user authentication registration table 26 are configured such that they cannot be altered by the access from the outside, and the outside device registration table 25 is configured such that it cannot be altered even by the user access from inside the home.

The DTCP bridge processing unit 21 logically connects the inside network and the outside network, and carries out the bridge processing including the reception of the encrypted AV data from the transmission device 2 and decryption of the encrypted AV data (the decryption using a key obtained by the inside DTCP AKE processing unit 23), the re-encryption (the encryption using a key agreed upon by the outside DTCP AKE processing unit 24), and the transmission of the encrypted AV data to the reception device 6.

The automatic configuration recognition and home electronics control Web server processing unit 22 has a function for automatically recognizing the configuration of devices existing in the home network or devices capable of controlling and monitoring from the outside DTCP bridge 4 and automatically producing a Web page for controlling, monitoring and managing these devices, and a function for publicly disclosing the produced Web page to outside the home by using an internal Web server. It is also possible to disclose the produced Web page to inside the home as well.

Figure 4:
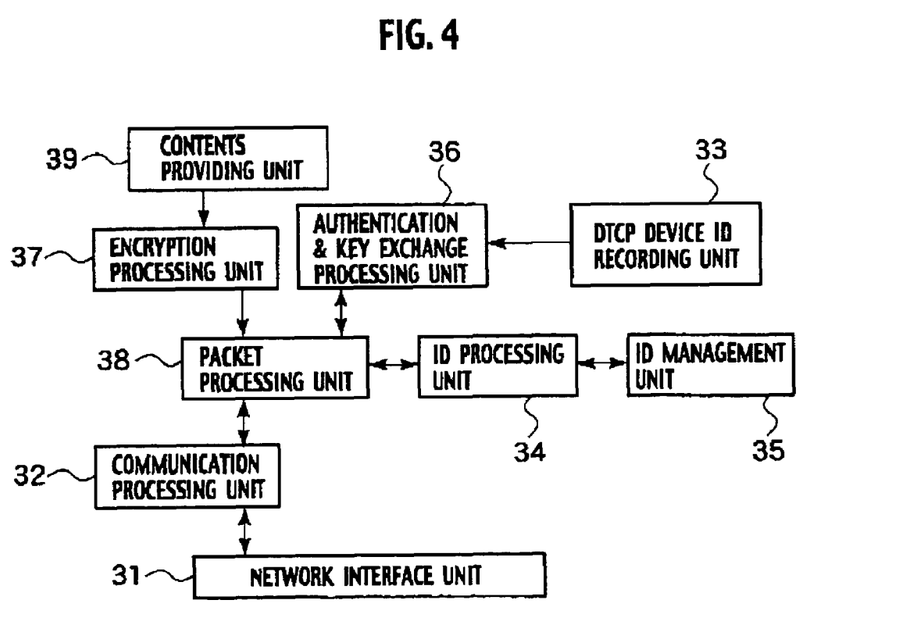
FIG. 4 is a block diagram showing an exemplary internal configuration of a transmission device inside a user's home in the communication system of FIG. 1.

FIG. 4 shows an exemplary internal configuration of the transmission device 2 inside the user's home 1. As shown in FIG. 4, the transmission device 2 has a network interface unit 31, a communication processing unit 32 for carrying out the communication processing, a DTCP device ID recording unit 33 for recording the DTCP device ID of this transmission device 2, an ID processing unit 34 for processing the DTCP device ID and the MAC address transmitted from the outside DTCP bridge 4, an ID management unit 35 for registering the DTCP device ID and the MAC address into an ID list and carrying out the processing for comparing the IDs received from the outside DTCP bridge 4 with the values recorded in the ID list, an authentication and key exchange processing unit 36 for carrying out the DTCP authentication and key exchange processing for the purpose of the copyright protection, an encryption processing unit 37 for carrying out encryption/decryption of the data to be transmitted, a packet processing unit 38 for converting the AV contents data and the DTCP management data to be transmitted to the outside DTCP bridge 4 into communication packets, and a contents providing unit 39 for storing the contents.

Here, the DTCP device ID is an identification number of the DTCP device. It is preferably a value allocated to the DTCP device in advance such that each DTCP device has a unique value over the entire world.

Figure 5:
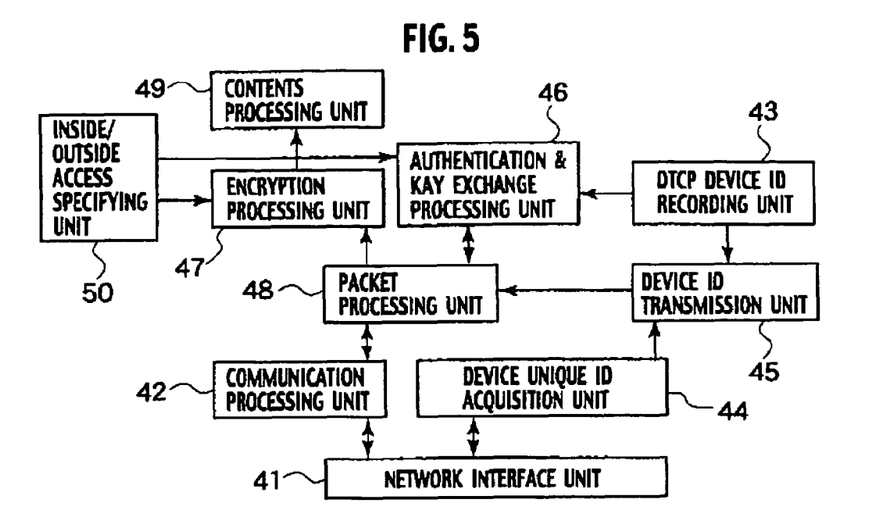
FIG. 5 is a block diagram showing an exemplary internal configuration of a reception device outside a user's home in the communication system of FIG. 1.

FIG. 5 shows an exemplary internal configuration of the reception device 6 outside the home. As shown in FIG. 5, the reception device 6 has a network interface unit 41 for carrying out the network processing, a communication processing unit 42 for carrying out the communication processing, a device ID recording unit 43 for recording the DTCP device ID of the reception device 6, a device unique ID acquisition unit 44 for acquiring a device unique value (MAC address), a device ID transmission unit 45 for transmitting the acquired device ID, an authentication and key exchange processing unit 46 for carrying out the DTCP authentication and key exchange processing for the purpose of the copyright protection, an encryption processing unit 47 for carrying out encryption/decryption of the received data, a packet processing unit 48 for converting the received packets into the AV contents data and the DTCP management data, a contents processing unit 49 for carrying out the processing to output or store the packets to a display device or the like, and an inside/outside access specifying unit 50 for specifying whether this reception device 6 is to be used inside the home or outside the home.

The inside/outside access specifying unit 50 has a function for specifying the case in which the reception device 6 is to be used inside the user's home (a state in which the communication with the transmission device 2 is possible without passing through the outside DTCP bridge 4) and the case in which the reception device 6 is to be used outside the user's home (a state in which the communication with the transmission device 2 is possible only through the outside DTCP bridge 4).

In the case of using the reception device 6 inside the home, the encryption processing unit 47 and the authentication and key exchange processing unit 46 carry out communications by using the DTCP protocol for the home use (which permits only TTL=1, 2 or 3, for example). Also, in the case of using the reception device 6 outside the home, the encryption processing unit 47 and the authentication and key exchange processing unit 46 carry out communications by using the DTCP protocol for the outside use (which carries out the user authentication in advance or permits multiple TTL, for example).

The inside/outside switching specification by the inside/outside access specifying unit 50 may be made manually by the user, or automatically as the reception device 6 itself judges the location and the arrangement state of the reception device 6 by using GPS, etc.

The value unique to the device acquired by the device unique ID acquisition unit 44 indicates the MAC address of the network interface physically recorded in that device which is allocated as a value unique to each device and managed by a network device manufacturing vendor, for example. It can be the Ethernet MAC address, a node_vendor_id or chip_id defined in the IEEE 1394, or a combination of these, for example.

Now, the processing procedure in the case of transmitting the AV contents from the transmission device 2 inside the user's home 1 to the reception device 6 outside the user's home 1 through the home network 3, the outside DTCP bridge 4 and the Internet 5 (public network) will be described in further detail.

Figure 6A:
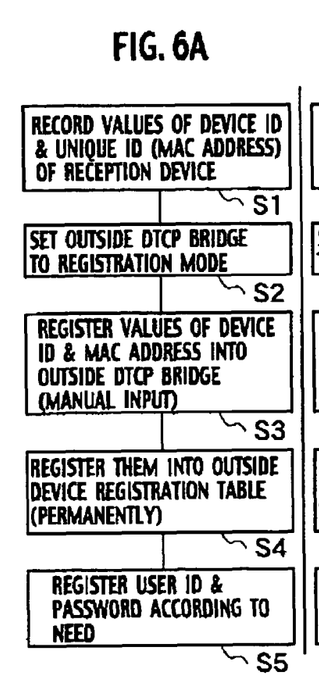
FIGS. 6A, 6B and 6C are flow charts showing procedures for registration into an outside device registration table in the outside DTCP bridge of FIG. 2.
Figure 6B:
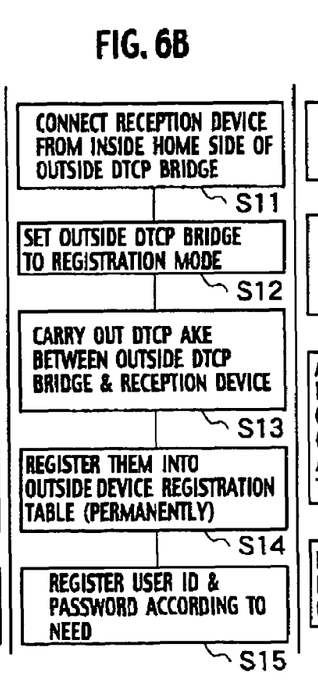
Figure 6C:
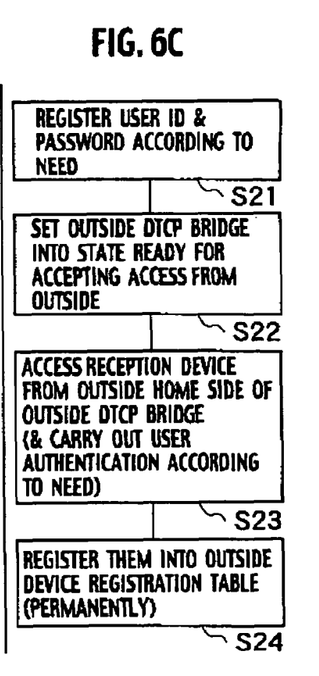

In this embodiment, the reception device 6 is registered into the outside DTCP bridge 4 first. More specifically, the reception device 6 is registered into the outside device registration table 25 in the outside DTCP bridge 4. There are three procedures for the registration into the outside device registration table 25, as shown in FIGS. 6A, 6B and 6C.

The first registration procedure is a method for registering the reception device 6 by the manual input into the outside device registration table 25 of the outside DTCP bridge 4 in advance. More specifically, the registration can be made through some user interface (liquid crystal screen and buttons, etc.) that are provided in the outside DTCP bridge 4, or by using a user interface of PC or TV (and remote controller) via the home network 3, for example.

In the case of the first registration procedure, the user first enters the device ID and the unique ID (a value of the MAC address in this embodiment) of the device by which the user wishes to make an access from the outside (the reception device 6 in this embodiment) in some way (step S1).

Next, according to the need, the outside DTCP bridge 4 is set to a mode in which the registration into the outside device registration table 25 is possible (step S2). Then, the device ID and the unique ID (MAC address) entered at the step S1 are registered into the outside device registration table 25 (step S3). At a time of the registration, the values may be entered manually by using a keyboard or the like, or the values may be set automatically.

Once the values are registered into the outside device registration table 25, the registered content will be recorded permanently (step S4), and it is preferably made such that the user cannot change the registered content later on. This is because if the multiple registration by the repetition of the deletion and the re-registration is allowed, it would become possible to transmit information to the outside device for a practically unlimited number of times by repeating the registration.

Also, at the same time, it is possible to carry out the registration of information related to the user authentication such as the user ID and the password or the like into the user authentication registration table 26 (step S5).

The second registration procedure is a method in which the reception device 6 is connected to the home network 3 (step S11), the outside DTCP bridge 4 is changed to a registration mode (step S12), the DTCP authentication and key exchange is carried out between the outside DTCP bridge 4 and the reception device 6 (step S13), and the outside DTCP bridge 4 stores its result (the DTCP device ID and the unique ID of the reception device 6) into the output device registration table 25 (step S14). Note that in the case where the reception device 6 has more than two DTCP device IDs, the DTCP device ID to be used for the outside communication will be stored into the outside device registration table 25.

Note that, in this case, in order to keep the value of the unique ID (MAC address) identical, the interface of the home network 3 and the interface for the outside Internet 5 (public network) should preferably be the same (radio LAN interface, for example).

Even in this case, it is preferably made such that the user cannot change the registered content later on, once the registration into the outside device registration table 25 is made. It is also possible to register the user authentication information such as the user ID and the password into the user authentication registration table 26 according to the need.

The third registration procedure is a method for making an ad hoc registration from the outside, rather than making the registration into the outside device registration table 25 of the outside DTCP bridge 4 from the inside the home in advance.

The outside DTCP bridge 4 is always set in a state capable of accepting an access of a new device from the outside, for example, and when the registration request or the DTCP authentication and key exchange request comes, the values of the device ID and the unique ID (MAC address in this embodiment) of that device are newly registered into the outside device registration table 25 (step S21). This registration is made permanently as in the above, and there is an upper limit to the number of devices that can be registered, so that it is impossible to register an unlimited arbitrary number of outside devices.

After that, the outside DTCP bridge 4 accepts an access request of the outside reception device 6 (step S22). When the outside reception device 6 makes the access request to the outside DTCP bridge 4, the user authentication is requested to this reception device 6 (step S23), and only the reception device 6 that has correctly responded to this request is registered into the outside device registration table 25 (step S24).

Figure 7:
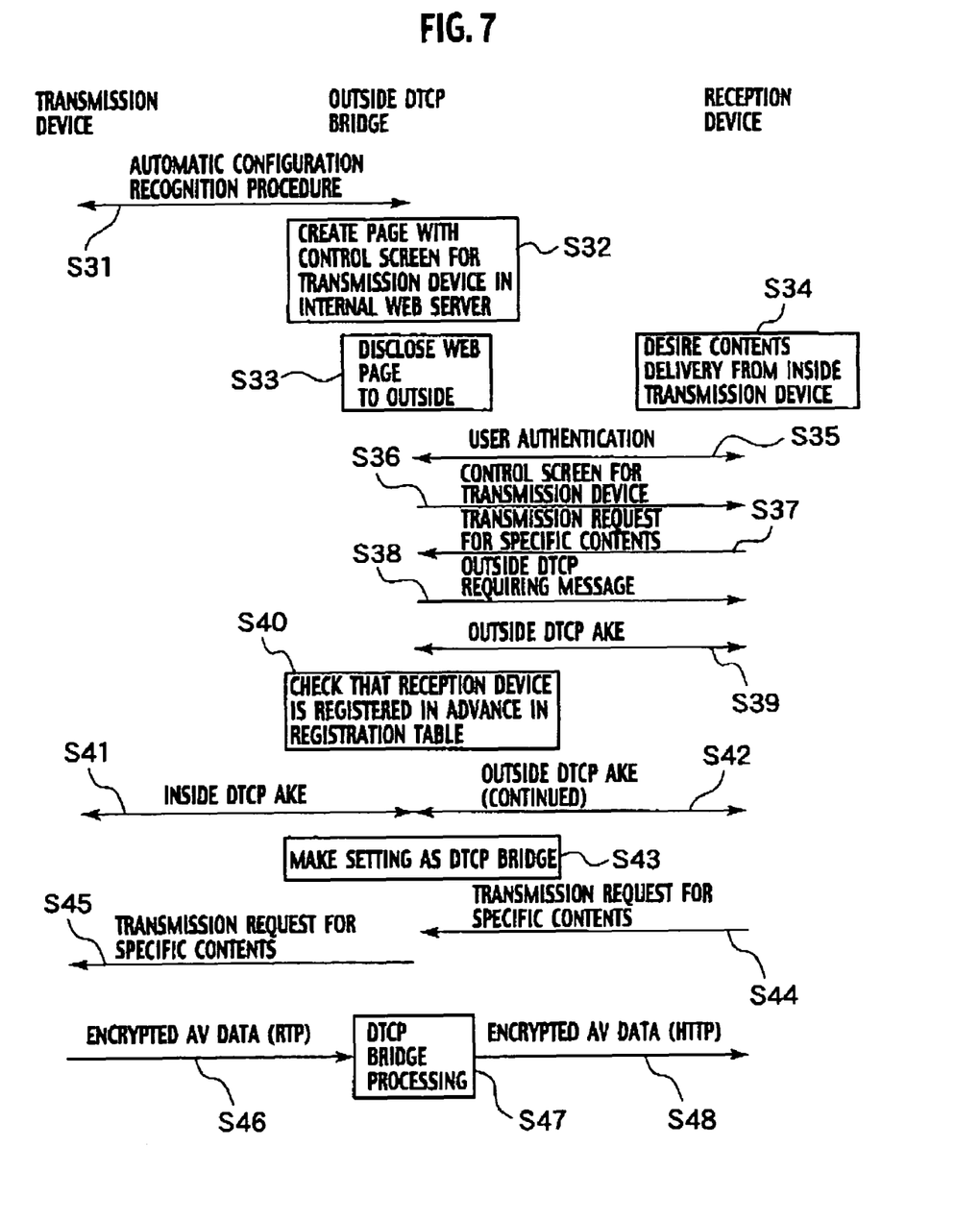
FIG. 7 is a sequence chart showing an exemplary processing procedure for carrying out communications between a user's home and a reception device outside a user's home in the communication system of FIG. 1.

FIG. 7 shows an exemplary processing procedure in the case of carrying out communications with the user's home 1 by actually using the reception device 6 outside the home, after the reception device 6 is registered in the outside device registration table 25 by any one of the first to third registration procedures shown in FIGS. 6A, 66 and 6C.

First, the outside DTCP bridge 4 recognizes the transmission device 2 that is connected to the home network 3 (or that has its power turned on), by using the automatic configuration recognition procedure (step S31). Next, the outside DTCP bridge 4 produces a Web page capable of controlling the transmission device 2 (step S32). This Web page contains a playback button, a contents selection button, etc.

Next, the outside DTCP bridge 4 publicly discloses the produced Web page to outside the home (step S33). Note that it is preferable to make this Web page accessible only by the outside device (such as the reception device 6) that has passed some kind of user authentication such as the above described user authentication.

Now, suppose that the reception device 6 that is located outside the home is wishing to download the AV contents in the transmission device 2 inside the user's home 1 (step S34). The user connects the reception device 6 to the Internet 5, and makes an access to the outside DTCP bridge 4 of the user's home 1 that is stored in advance in the reception device 6. Of course, it is also possible to specify the domain name or the IP address of the outside DTCP bridge 4 by the user's manual input. In this case, it is also possible to apply DDNS (Dynamic Domain Name Service) to the outside DTCP bridge 4.

The procedure by which the reception device 6 makes an access to the outside DTCP bridge 4 ts as follows. First, the user authentication is carried out between the reception device 6 and the outside DTCP bridge 4 (step S35). When the user authentication passes, the outside DTCP bridge 4 transits a control screen of the transmission device 2 to the reception device 6 through the automatic configuration recognition and home electronics control Web server processing unit 22 (step S36). Upon receiving this control screen, the reception device 6 selects an appropriate AV contents that can be provided by the transmission device 2 on the control screen, and transmits a request for transmitting the selected specific contents to the outside DTCP bridge 4 (step S37).

The outside DTCP bridge 4 carries out the communications with the transmission device 2 according to the need, and when it is recognized that the copyright protection is put on the transmission of the AV contents selected by the user (reception device 6) so that the DTCP authentication and key exchange is necessary before the transmission, the outside DTCP bridge 4 notifies that the DTCP authentication and key exchange (for outside the home) is necessary to the reception device 6 (step S38). It is also possible to specify that the content is DTCP-enabled in the content directory.

Upon receiving this notification, the outside DTCP authentication and key exchange processing is carried out between the outside DTCP bridge 4 and the reception device 6 (step S39). At this point, the device ID and the unique ID (MAC address or the like) of the reception device 6 may be registered in the device certificate of the reception device 6.

The outside DTCP bridge 4 checks whether (device ID and unique ID=MAC address of) the reception device 6 is registered in the outside device registration table 25 or not (step S40), and if it is registered, the outside DTCP bridge 4 connects the "authentication and key exchange between the transmission device 2 and the outside DTCP bridge 4 and the encryption, transmission and decryption processing of the AV contents" with the "authentication and key exchange between the outside DTCP bridge 4 and the reception device 6 and the encryption, transmission and decryption processing of the AV contents" (steps S41 to S43).

Namely, the encrypted contents transferred between the transmission device 2 and the outside DTCP bridge 4 are decrypted by using a key obtained by the authentication and key exchange between the transmission device 2 and the outside DTCP bridge 4 (step S41), the decrypted contents are encrypted by using a key obtained by the authentication and key exchange between the outside DTCP bridge 4 and the reception device 6 (step S42), and the setting of the DTCP bridge processing unit 21 is made such that the re-encrypted contents are transmitted to the reception device 6 (step S43).

When the request for transmitting the contents that require the copyright protection is made from the reception device 6 (step S44), the outside DTCP bridge 4 transmits the transmission request for that contents to the transmission device 2 (step S45).

The encrypted AV data transmitted from the transmission device 2 (step S46) are applied with the transcript processing (the decryption and re-encryption of the encrypted AV data) internally (step S47), and transmitted to the reception device 6 (step S48).

At that point, if there is a gap between the bandwidth of the home network 3 and the bandwidth (especially the subscriber line bandwidth) of the Internet 5 (public network), the transcode of the decrypted AV data. i.e. the conversion of the coding scheme and the compression bandwidth or the decrypted AV data, may be carried out inside the DTCP bridge processing unit 21 in the outside DTCP bridge 4. For example, in the case where the home network 3 is the Ethernet having a transmission power of 100 Mbps and the subscriber line of the public network (Internet 5) is the ADSL having a transmission power of 6 Mbps, the AV data are transmitted (after the encryption) in a form of MPEG2 video of over 25 Mbps on the home network 3, a conversion into a different coding scheme such as MPEG4 of about 1 Mbps or a compression bandwidth of MPEG2 of about 2 Mbps is made inside the outside DTCP bridge 4 (after the decryption), and the AV data are transmitted to the Internet 5 (after the re-encryption).

It is also possible to carry out the AV data transmission protocol conversion inside the DTCP processing unit 14, as in the case where the AV data transmission protocol between the transmission device 2 and the outside DTCP bridge 4 is RTP (Realtime Transport Protocol) and the AV data transmission protocol between the outside DTCP bridge 4 and the reception device 6 is HTTP (HyperText Transfer Protocol).

As described, in this first embodiment, the outside device registration table 25 is provided in the outside DTCP bridge 4 inside the user's home 1, and the contents transmission from inside the user's home 1 is permitted only to the reception device 6 that is registered in this table in advance, so that it is possible to prevent the illegal copy or the illegal acquisition of the contents that require the copyright protection, while offering an opportunity to utilize the contents even outside the home to the legitimate user, so that the convenience of the user can be improved.

Also, by providing the user authentication registration table 26 in the outside DTCP bridge 4, it is possible to transmit the contents only to the outside reception device 6 that has passed the user authentication, so that it is possible to reinforce the copyright protection.

Moreover, even if the AV data transmission protocols used inside the user's home 1 and outside the home or the attributes of the connected networks are different, this difference can be absorbed by the outside DTCP bridge 4 so that it is possible to transmit and receive the contents without much limitation on types of the transmission device 2 and the reception device 6.

Figure 8:
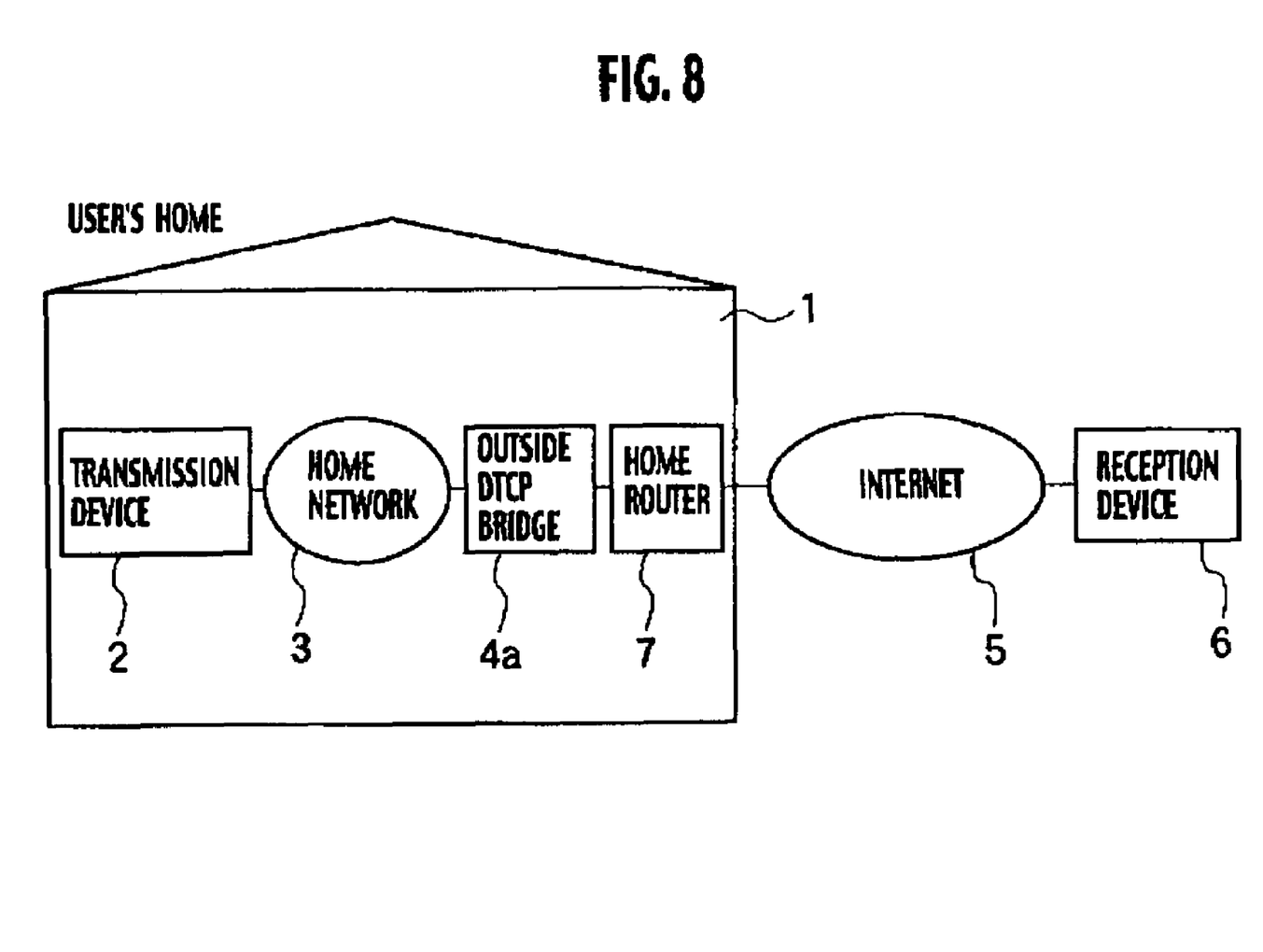
FIG. 8 is a block diagram showing an overall configuration of a communication system according to the second embodiment of the present invention.
Figure 9:
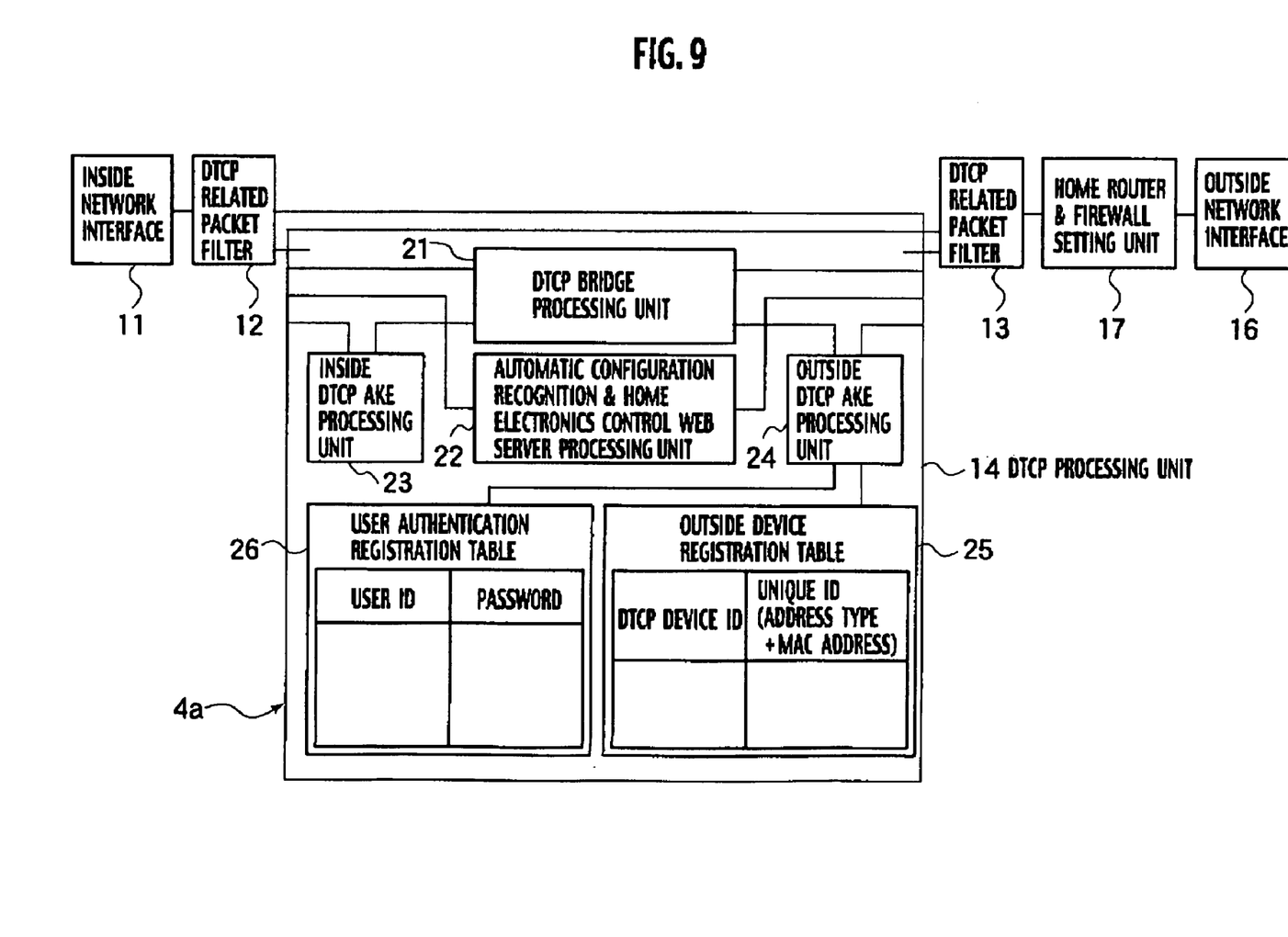
FIG. 9 is a block diagram showing an internal configuration of an outside DTCP bridge in the communication system of FIG. 8.
Figure 10:
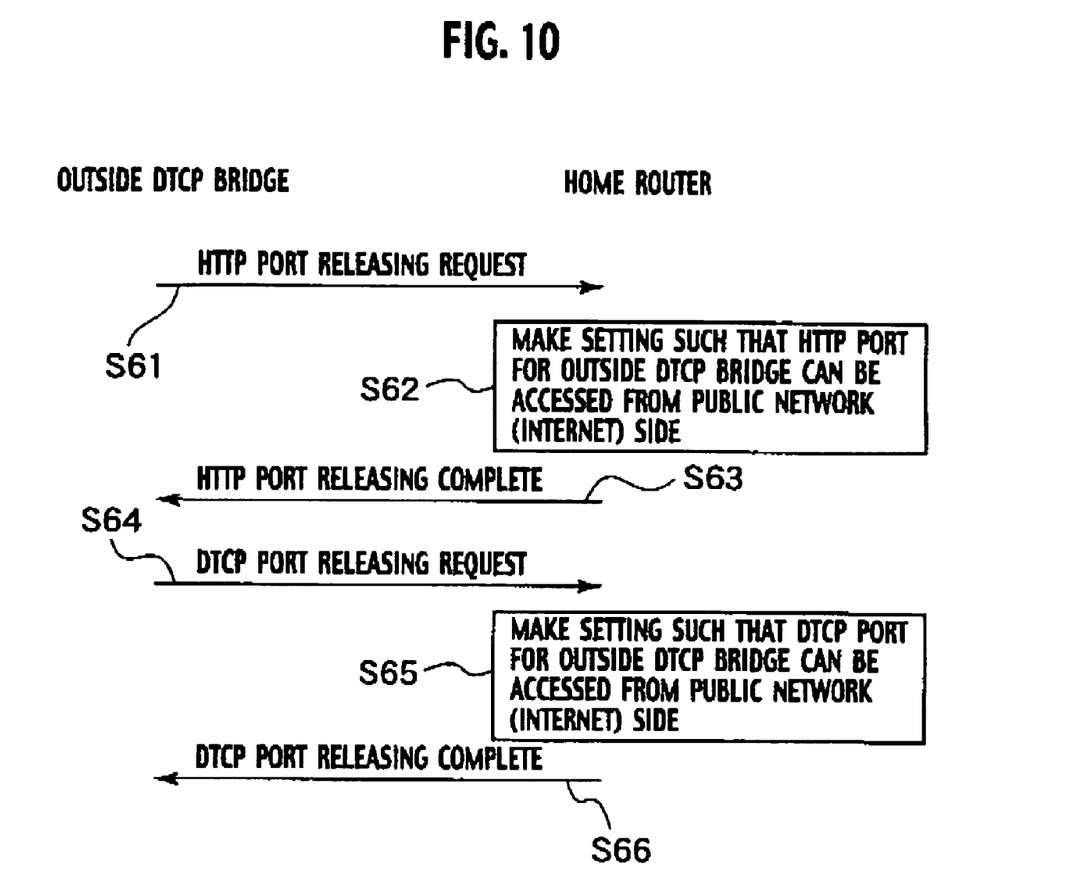
FIG. 10 is a sequence chart for a processing between an outside DTCP bridge and a home router in the communication system of FIG. 8

Referring now to FIG. 8 to FIG. 10, the second embodiment of the communication scheme according to the present invention will be described in detail.

The first embodiment is directed to an exemplary case where the home router is incorporated in the outside DTCP bridge 4, but it is also possible to provide the home router separately from the outside DTCP bridge.

FIG. 8 shows an overall configuration of a communication system according to the second embodiment of the present invention, and FIG. 9 shows an internal configuration of the outside DTCP bridge 4. In FIG. 8 and FIG. 9, the elements identical to those shown in FIG. 1 and FIG. 2 are given the same reference numerals, and the difference will be mainly described in the following.

As shown in FIG. 8, a home router 7 is provided separately from the outside DTCP bridge 4a inside the user's home 1, and a home router and firewall setting unit 17 for making various setting with respect to the home router 7 is provided inside the outside DTCP bridge 4a. The rest of the configuration is the same as in the first embodiment.

The following three methods are available as a method for making an access from the outside reception device 6 to the outside DTCP bridge 4a. (1) A NAT (Network Address Translation) function is provided inside the home router 7, such that the reception device 6 can make the access to the outside DTCP bridge 4a by accessing a specific port of the home router 7. (2) The outside DTCP bridge 4a has a globally unique IP address, and there is a "hole" for a specific port in the home router 7, such that it is possible to make a direct access from the reception device 6 to the outside DTCP bridge 4a. (3) It is also possible to combine the above described (1) and (2).

In the case of (3), as shown in FIG. 10, the outside DTCP bridge 4a makes an HTTP port releasing request to the home router 7, by using UPnP (Universal Plug and Play, see "http://www.upnp.org", for example) (step S61). Upon receiving this request, the home router 7 makes the setting such that the HTTP port for the outside DTCP bridge 4a can be accessed from the Internet 5 (step S62). Then, the home router 7 transmits an HTTP port releasing complete notice to the outside DTCP bridge 4a (step S63).

Next, the outside DTCP bridge 4a makes a DTCP port releasing request to the home router 7 (step S64). Upon receiving this request, the home router 7 makes the setting such that the DTCP port for the outside DTCP bridge 4a can be accessed from the Internet 5 (step S65). Then, the home router 7 transmits a DTCP port releasing complete notice to the outside DTCP bridge 4a (step S66).

In the case of the above described (1), a specific port number (a port number of TCP or UDP to be used for the DTCP authentication and key exchange, the AV data transmission and HTTP) is notified from the outside DTCP bridge 4a to the home router 7, and the setting is made such that a packet arrived to this port number will be transmitted to the outside DTCP bridge 4a.

Also, in the case of (2), the fact that the outside DTCP bridge 4a itself has a global IP address is notified from the outside DTCP bridge 4a to the home router 7, and the setting is made such that the packet destined to the outside DTCP bridge 4a can be correctly routed.

The processing other than those described above, i.e. the DTCP authentication and key exchange among the transmission device 2, the outside DTCP bridge 4a and the reception device 6, the encrypted AV data transfer, and the DTCP bridging in the outside DTCP bridge 4a are the same as in the first embodiment, so that their description will be omitted here.

As described, according to the second embodiment, the home router 7 is provided separately from the outside DTCP bridge 4a, so that the communication system of this embodiment can be constructed from even the communication system which already has the home router 7, by utilizing that home router 7, and therefore the increase of the facility cost can be suppressed.

The first and second embodiments described above are directed to an exemplary case of transmitting information from the user's home 1 to the outside, but conversely it is also possible to transmit the contents from the outside device to the user's home 1. In the case of transmitting the contents from the outside to the user's home 1, only the outside device that is registered in advance in the outside device registration table 25 inside the outside DTCP bridge 4 can be permitted to transmit the contents to the user's home 1, so as to realize the copyright protection of the contents.

The outside DTCP bridge 4 described in the above embodiments may be realized in a form of either hardware or software. In the case of software configuration, a program for realizing functions of the outside DTCP bridge 4 is stored in a recording medium such as floppy disk or CD-ROM, which can be read out from there and executed by a computer. The recording medium is not necessarily limited to a portable one such as a magnetic disk or an optical disk, and can be a fixed one such as a hard disk device or a memory device.

It is also possible to distribute a program for realizing functions of the outside DTCP bridge 4 through communication channels (including those of the radio communications) of the Internet or the like. In addition, this program may be distributed in an encrypted, modulated or compressed state, through the wired channels of the Internet or the like or the radio channels, or by storing it in a recording medium.

As described above, according to the present invention, if the outside communication device is not registered, the communication between the inside network and the outside network is not permitted, so that the illegal copying or the illegal acquisition of information can be prevented surely. Also, if the outside device is registered and the authentication and key exchange succeeds, the communication between the inside network and the outside network is permitted, so that the information maintained inside the home can be utilized by the legitimate user outside the home, and therefore the convenience of the user can be improved.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A communication relay device connected to a home network, for relaying information between an outside communication device connected to an outside network and a home communication device connected to the home network, comprising:
    a first copyright protection unit configured to carry out a first authentication and key exchange processing for purpose of copyright protection between the communication relay device and the home communication device on the home network;
    a second copyright protection unit configured to carry out a second authentication and key exchange processing for purpose of copyright protection between the communication relay device and the outside communication device on the outside network, based on a scheme different from the first authentication and key exchange processing;
    an identification information memory unit which stores an identification information of the outside communication device prepared at least on the basis of the device ID of the outside communication device uniquely assigned beforehand among all copyright protection devices worldwide; and
    a bridge processing unit configured to receive an access request for the home network from the outside communication device, and carry out transmission/reception of content that requires copyright protection between the home network and the outside network only when the identification information of the outside communication device which made the access request is stored in the identification information memory unit and then only when both the first authentication and key exchange processing by the first copyright protection unit and the second authentication and key exchange processing by the second copyright protection unit succeed.

2. The communication relay device of claim 1, further comprising a registration control unit configured to limit a number of outside communications devices that can be stored in the identification information memory unit to a prescribed number.

3. The communication relay device of claim 1, further comprising a registration control unit configured to prohibit a deletion of a stored identification information in the identification information memory unit.

4. The communication relay device of claim 1, wherein the identification information memory unit stores in advance at least one of a device ID for identifying the outside communication device and a physical address of a communication interface for purpose of copyright protection, before transmitting contents to the outside communication device.

5. The communication relay device of claim 1, wherein the identification information memory unit has a mode for storing a result of the second authentication and key exchange processing by the second copyright protection unit, in a state where an access to the home network is permitted to the outside communication device.

6. The communication relay device of claim 5, further comprising:
    a user information memory unit which stores a user authentication information for the outside communication device; and
    an authentication judgment unit configured to judge whether the user authentication information of the outside communication device which made the access request for the home network is stored in the user information memory unit or not;
    wherein the bridge processing unit judges whether or not to permit an access between the home network and the outside network, according to a judgment result of the authentication judgment unit.

7. The communication relay device of claim 5, further comprising:
    a user information memory unit which stores a user authentication information for the outside communication device; and
    an authentication judgment unit configured to judge whether the user authentication information of the outside communication device which made the access request for the home network is stored in the user information memory unit or not;

wherein the identification information memory unit stores at least one of a device ID for identifying the outside communication device and a physical address of a communication interface for purpose of copyright protection, according to a judgment result of the authentication judgment unit.

8. The communication relay device of claim 1, wherein the identification information memory unit has a mode for storing a result of the first authentication and key exchange processing by the first copyright protection unit.

9. The communication relay device of claim 8, further comprising:
    a user information memory unit which stores a user authentication information for the outside communication device; and
    an authentication judgment unit configured to judge whether the user authentication information of the outside communication device which made the access request for the home network is stored in the user information memory unit or not;
    wherein the bridge processing unit judges whether or not to permit an access between the home network and the outside network, according to a judgment result of the authentication judgment unit.

10. The communication relay device of claim 8, further comprising:
    a user information memory unit which stores a user authentication information for the outside communication device; and
    an authentication judgment unit configured to judge whether the user authentication information of the outside communication device which made the access request for the home network is stored in the user information memory unit or not;
    wherein the identification information memory unit stores at least one of a device ID for identifying the outside communication device and a physical address of a communication interface for purpose of copyright protection, according to a judgment result of the authentication judgment unit.

11. The communication relay device of claim 1, further comprising:
    a Web page production unit configured to produce a Web page describing information for controlling the home communication device; and
    a Web page disclosing unit configured to transmit the Web page produced by the Web page production unit to the outside network;
    wherein the outside communication device controls transmission of content that requires copyright protection from the home communication device by using the Web page received through the outside network.

12. The communication relay device of claim 1, wherein the first copyright protection unit realizes copyright protection by adopting at least one of a provision for limiting a TTL (Time To Live) field of a packet transmitted/received between the home communication device and the outside communication device to a specific value, a provision for using a link local address in an Internet protocol, and a provision for using a Ethernet frame as a transmission packet.

13. The communication relay device of claim 1, further comprising a routing control unit configured to notify a specific port number to a connection device for carrying out a connection control for the home network and the outside network, and make a setting such that a packet transmitted to the specific port number will be transmitted to the communication relay device.

14. The communication relay device of claim 1, further comprising a routing control unit configured to notify a global IP address of the communication relay device to a connection device for carrying out a connection control for the home network and the outside network, and make a setting such that a packet destined to the global IP address will be transmitted to the communication relay device.

15. The communication relay device of claim 1, wherein the bridge processing unit also carries out at least one of a coding conversion, a protocol conversion and a bandwidth conversion for data entered from one of the outside network and the home network, and then transmits converted data to another one of the outside network and the home network.

16. A communication system, comprising:
    a home communication device on a home network;
    an outside communication device on an outside network; and
    a communication relay device for relaying information between the home network and the outside network, the communication relay device having:
    a first copyright protection unit configured to carry out a first authentication and key exchange processing for purpose of copyright protection between the communication relay device and the home communication device on the home network;
    a second copyright protection unit configured to carry out a second authentication and key exchange processing for purpose of copyright protection between the communication relay device and the outside communication device on the outside network, based on a scheme different from the first authentication and key exchange processing;
    an identification information memory unit which stores an identification information of the outside communication device prepared at least on the basis of the device ID of the outside communication device uniquely assigned beforehand among all copyright protection devices worldwide; and
    a bridge processing unit configured to receive an access request for the home network from the outside communication device, and carry out transmission/reception of content that requires copyright protection between the home network and the outside network only when the identification information of the outside communication device which made the access request is stored in the identification information memory unit and then only when both the first authentication and key exchange processing by the first copyright protection unit and the second authentication and key exchange processing by the second copyright protection unit succeed.

17. A computer program product embodied on a computer readable medium for causing a computer to function as a communication relay device connected to a home network, for relaying information between an outside communication device connected to an outside network and a home communication device connected to the home network, the computer program product comprising:
    a first computer program code loaded in a processing unit for causing the computer to carry out a first authentication and key exchange processing for purpose of copyright protection between the communication relay device and the home communication device on the home network;

a second computer program code loaded in a processing unit for causing the computer to carry out a second authentication and key exchange processing for purpose of copyright protection between the communication relay device and the outside communication device on the outside network, based on a scheme different from the first authentication and key exchange processing;

a third computer program code loaded in a processing unit for causing the computer to store an identification information of the outside communication device prepared at least on the basis of the device ID of the outside communication device uniquely assigned beforehand among all copyright protection devices worldwide; and a fourth computer program code loaded in a processing unit for causing the computer to receive an access request for the home network from the outside communication device, and carry out transmission/reception of content that requires copyright protection between the home network and the outside network only when the identification information of the outside communication device which made the access request is stored in the identification information memory unit and then only when both the first authentication and key exchange processing by the first computer program code and the second authentication and key exchange processing by the second computer program code succeed.

* * * * *